(12) United States Patent
Brauer

(10) Patent No.: US 9,334,056 B2
(45) Date of Patent: May 10, 2016

(54) METHOD OF OPTIMIZING GEOMETRY OF A SEATING ELEMENT

(75) Inventor: R. Klaus Brauer, Seattle, WA (US)

(73) Assignee: B/E Aerospace, Inc., Wellington, FL (US)

(*) Notice: Subject to any disclaimer, the term of this patent is extended or adjusted under 35 U.S.C. 154(b) by 1043 days.

(21) Appl. No.: 13/437,440

(22) Filed: Apr. 2, 2012

(65) Prior Publication Data
US 2012/0253752 A1 Oct. 4, 2012

Related U.S. Application Data

(60) Provisional application No. 61/470,176, filed on Mar. 31, 2011.

(51) Int. Cl.
*G06F 17/50* (2006.01)
*B64D 11/06* (2006.01)
*A47C 31/12* (2006.01)

(52) U.S. Cl.
CPC .............. *B64D 11/06* (2013.01); *A47C 31/126* (2013.01); *B64D 11/0649* (2014.12)

(58) Field of Classification Search
CPC ... A47C 31/126; B64D 11/0649; B64D 11/06
USPC ................................................. 703/1
See application file for complete search history.

(56) References Cited

U.S. PATENT DOCUMENTS

2006/0150756 A1* 7/2006 Kassing ............... A47C 31/126
702/196

* cited by examiner

*Primary Examiner* — Eunhee Kim
(74) *Attorney, Agent, or Firm* — Shumaker, Loop & Kendrick, LLP

(57) ABSTRACT

A method of optimizing the geometry of seating components for a range of individual body shapes in a single posture or a variety of postures. The method includes defining a two-dimensional shape of a membrane with given deformation or elasticity characteristics optimized for supporting a defined population in a given posture, or multiple postures.

11 Claims, 3 Drawing Sheets

METHOD OF OPTIMIZING GEOMETRY OF A SEATING ELEMENT

CROSS-REFERENCE TO RELATED APPLICATION

This application claims priority to U.S. Provisional Application No. 61/470,176 filed Mar. 31, 2011, the contents of which are incorporated by reference herein.

TECHNICAL FIELD AND BACKGROUND OF THE INVENTION

The present invention relates to seating of the general type wherein an initially planar membrane is used as a seat bottom or seat back member to support a seat occupant. The membrane can be a woven or knitted fabric, or other material, and may be elastic or inelastic.

Aircraft passenger seats are required to be as lightweight as possible consistent with passenger safety and comfort. Passenger comfort depends to some extent on the time seated, which is itself a function of loading and unloading, taxiing, and flight time. Seats in relatively short haul, single seating class, commuter aircraft generally have lighter-weight seats with less cushioning. Often, the seat pan and backrest supports are formed of fabric membranes stretched across tubular frame members, and are initially planar, i.e., when not under load, they form a single two-dimensional plane across a span width. The membrane may be covered with a seat cushion. When under load, the combined deformation of the overlying seat cushion and the membrane provide an enlarged surface area of contact with and reduced pressure on the posterior (i.e., buttocks), thighs and back of the seat occupant.

Within the confines of required weight, g-loading, material, comfort and wear longevity criteria, determining the optimum characteristics of the seat bottom or seat back membrane in its "relaxed" state is desirable as a basis for providing a comfortable seat when the membrane is installed under tension and subjected to weight-induced loading.

Determining an optimum seat size and shape is particularly challenging within the required parameters of aircraft seat design. A wide variety of body shapes must be accommodated, in contrast to the ability of a chair purchaser to select and purchase a chair suited to the needs of individual or a small number of known body types. Conference room seating, theater seating and other group seating may be, with regard to comfort but not weight, similarly challenging as is airline passenger seating because individuals do not have the opportunity to choose a personalized seat. For this reason, while the explanation and description of the invention in this application relates specifically to optimizing the geometry of aircraft seats, the methods set out in this application also have application to seats of other types used in different venues.

Known membrane suspension seating design offers no mechanism for optimizing seating for the wide variety of body shapes present in the population, or to multiple postures. Accordingly, what is needed is a mechanism applicable to lightweight seat membranes, as well as a method to optimize a seat membrane for a commonly-encountered range of passengers and seating postures.

BRIEF SUMMARY OF THE INVENTION

In one aspect, a method of defining the geometry of the seating components that is optimized for a range of individual body shapes in a single posture or a variety of postures is provided herein.

In another aspect, the method includes steps for defining the two dimensional shape of a membrane with given deformation or elasticity characteristics optimized for supporting a defined (or entire) population in a given posture, or multiple postures.

In yet another aspect, the method includes converting three-dimensional maps of body surfaces into an optimized value for two-dimensional membranes and associated structures used to support a seated individual.

In yet another aspect, the method includes determining optimized values for two-dimensional membranes and associated structures for supporting multiple body shapes in a given posture.

In yet another aspect, the method includes determining optimized values for two-dimensional membranes for supporting multiple body shapes in multiple postures.

In yet another aspect, the method includes determining an optimized shape of a frame member used to suspend a two-dimensional membrane for supporting multiple body shapes in a given posture.

In yet another aspect, the method includes determining an optimized shape of a frame member used to suspend a two-dimensional membrane for supporting multiple body shapes in multiple postures.

In yet another aspect, the method includes determining an optimized value for localized elasticity in a two-dimensional membrane for supporting multiple body shapes in a given posture.

In yet another aspect, the method includes determining an optimized value for localized elasticity in a two-dimensional membrane for supporting multiple body shapes in multiple postures.

To achieve the foregoing and other aspects and advantages, in one embodiment a method for optimizing the geometry of a seat membrane including the steps of: (a) forming a three-dimensional map of a contact body portion of a subject seated in a predetermined posture by dividing one or more defined reference planes into transverse bands; (b) dividing each of the bands into cells and calculating an average displacement of the cells from the one or more reference planes; (c) defining positions of frame members supporting each end of the seat membrane relative to each of the bands; (d) identifying cells of tangency from the positions of the frame members to the bands and calculating the distance from each of the positions of the frame members to their the cells of tangency; (e) determining positions of the seat membrane at extreme ends of areas that bridge areas of concavity on the surface of the subject's body for each of the bands and calculating the bridging distance of supporting bands across areas of concavity; (f) calculating the lengths of the supporting bands in contact with the body; (g) calculating the total length under load of each supporting band; (h) calculating an average pressure multiplier for each supporting band; (i) calculating a desired total perpendicular-to-plane load for each supporting band; (j) calculating a relaxed length of each supporting band when not installed on the frame members; (k) calculating an optimum relaxed length of each supporting band when not installed on the frame members based on the frame position and seat membrane elasticity to define a relaxed shape of the seat membrane when not installed on the frame members; and (l) utilizing variations in the relaxed length of each supporting band when not installed on the frame members to optimize seat membrane elasticity to accommodate multiple subjects.

The method may further be used to optimize the frame member shape supporting the seat membrane.

The method may further include repeating steps (a)-(l) for additional seating postures and multiple subjects.

The reference planes may include a transverse back plan parallel to the subject's back and a transverse bottom plane parallel to the bottom of the subject's buttocks and thighs. The transverse bands may be identified by whether they are oriented to the back or bottom plane and by their distance from an intersection of the back and bottom planes.

The cells of tangency may be identified by calculating a slope of a line connecting the location of an adjacent frame member and each cell such that the cell with the lowest slope to a left-hand frame member position is the cell of tangency for the left-hand frame member and the cell with the highest slope to the right-hand frame position is the cell of tangency for the right-hand frame member position.

The total length under load of each supporting band may be the sum of the right and left distances from the frame member locations to the cells of tangency, the bridging distance, and the lengths of the right and left supporting bands in contact with the body.

In another embodiment, a method of optimizing the geometry of seating components for a range of individual body shapes in a variety of postures is provided herein and includes the steps of: (a) dividing a three-dimensional map of a seat membrane deformed under a passenger load into a plurality of bands transverse a centerline of the seat membrane and with respect to a reference plane; (b) dividing each of the bands into equal cells and calculating the average displacement of the cells from the reference plane; (c) defining positions of frame members supporting the ends of the seat membrane relative to each of the bands; (d) identifying cells of tangency from the frame members to the bands; (e) calculating the distance from the frame members to the cells of tangency; (f) determining positions of the seat membrane at ends of areas that bridge areas of concavity on the surface of the passenger's body for each of the bands and calculating the bridging distance of the bands across the areas of concavity; (g) calculating the lengths of the bands in contact with the body; (h) calculating the total length under load of each band; (i) calculating an average pressure multiplier for each band; (j) calculating a desired total perpendicular-to-plane load for each band; (k) calculating a relaxed length of each band when not installed on the frame members; (l) calculating an optimum relaxed length of each band when not installed on the frame members based on the frame position and seat membrane elasticity to define a relaxed shape of the seat membrane when not installed on the frame members; and (m) utilizing variations in the relaxed length of each band when not installed on the frame members for multiple subjects to optimize seat membrane elasticity.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Processes for obtaining three-dimensional maps and defining desired pressure distributions per se are known in the art. For example, see published PCT patent application WO 2010/112219A1 and U.S. Pat. No. 3,081,129, the disclosures of which are hereby incorporated by reference in their entireties. The method of the present invention further provides for the optimization of the shape of the frame members used to support the membrane and for the optimization of the localized deformation and/or elasticity of the supporting membrane. The creation of such three-dimensional maps and definition of pressure distributions does not form a part of this invention.

As used herein, the terms "planar" and "two-dimensional" in relation to the membrane refers to the flat, unloaded shape of the membrane. The membrane has a thickness and is therefore not literally two-dimensional. For purposes of carrying out the methods of the invention described herein, the third dimension (i.e., the thickness of the membrane) is not significant.

Figure 1:
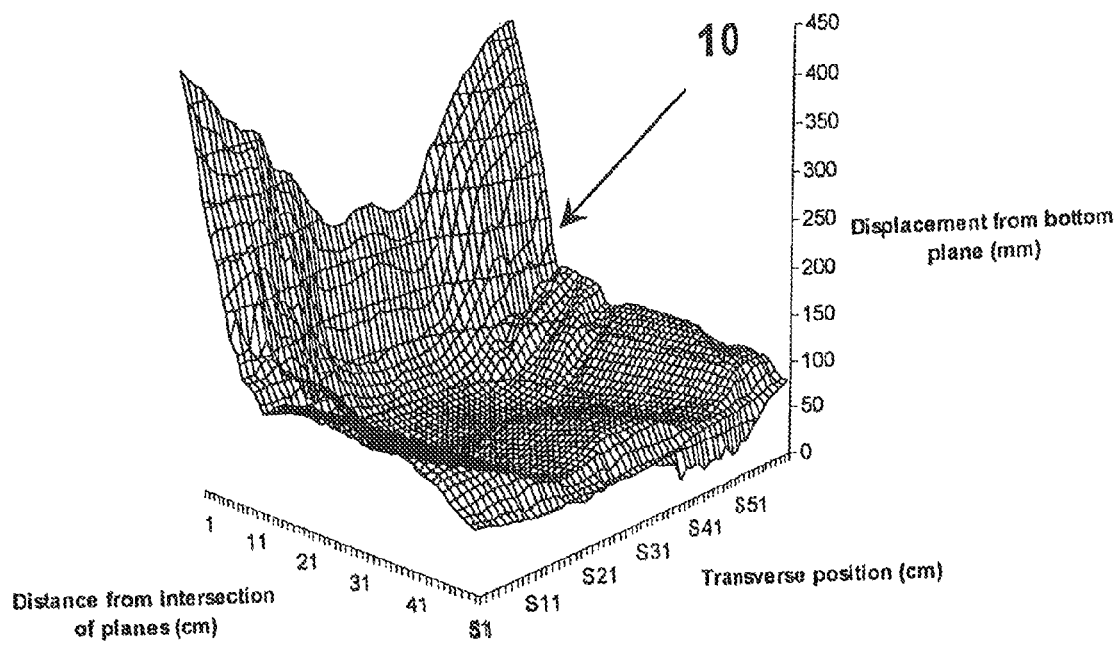
FIG. 1 is a three-dimensional map representing membrane displacement of a subject seated in a selected posture.

One embodiment of the invention includes first creating three-dimensional maps, for example, as shown in FIG. 1. The map, or maps, for each subject seated in a predetermined posture with predetermined body portions contacting the membrane are divided into transverse bands (i.e., from the subject's left to right or vice versa), as shown in FIGS. 2 and 3, in one or more defined reference planes.

Figure 2:
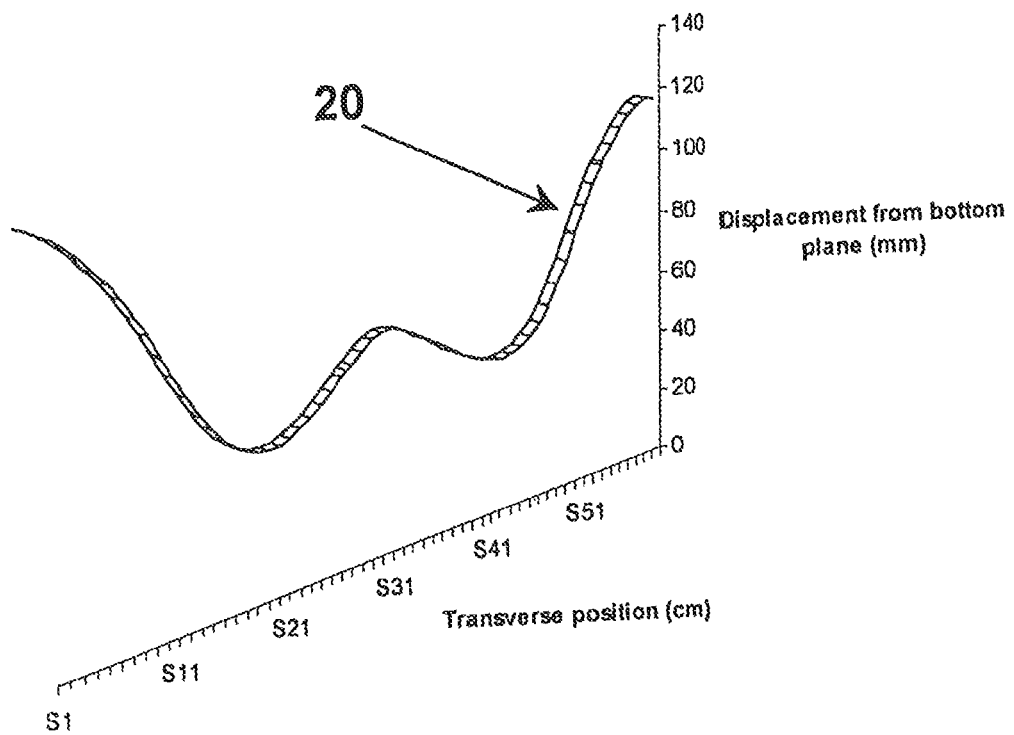
FIG. 2 is a three-dimensional map of a single transverse band, from the subject's left to right or vice versa taken from FIG. 1 in a single predetermined reference plane.
Figure 3:
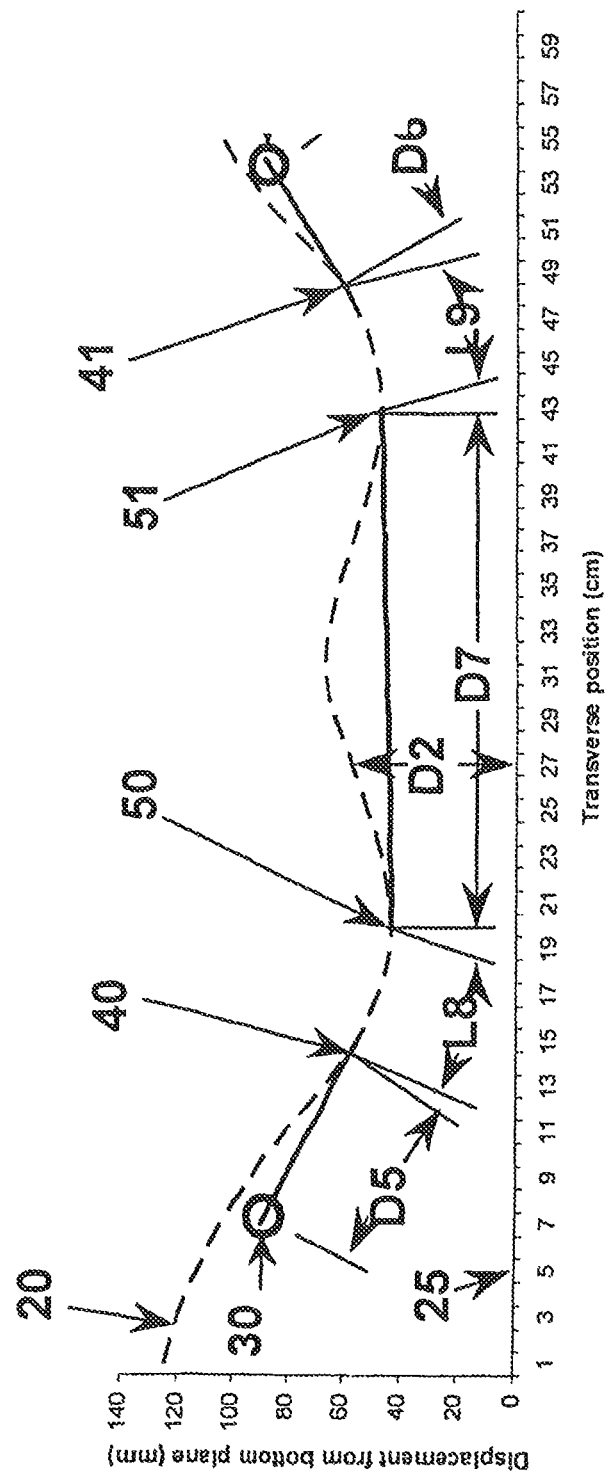
FIG. 3 illustrates the single transverse band of FIG. 2 portrayed on a traditional two-dimensional mathematical plane.

The bands as shown in FIGS. 2 and 3 are one centimeter wide, for example, and are oriented to either a transverse plane generally parallel to the subject's back or a transverse plane generally parallel to the bottom of the subject's posterior and thighs. The bands are identified by whether they are oriented to the back or bottom plane and by their distance from the intersection of the back and bottom planes.

As shown in FIG. 3, each transverse band 20 is divided into a plurality of cells and the average displacement D2 of each cell from the reference plane is calculated. Although the cells are chosen to be one centimeter wide, other values are envisioned. According to one embodiment, the bands are illustrated in FIG. 3 on a traditional Cartesian two-dimensional mathematical plane to the right and above of the origin in the first quadrant, stretching generally in the horizontal (x) axis with the displacement D2 shown along the vertical (y) axis. The positions of the frame members 30 and 31 for supporting each end of the membrane are defined relative to each band.

The method then proceeds by identifying and drawing the points, or "cells" of tangency 40, 41 of lines from the position of the frame members 30, 31 to the bands 20. The cells of tangency 40, 41 are identified by calculating the slope of the line connecting the locations of the frame members and each cell. The cell with the lowest slope to the left-hand frame member position 30 is the cell of tangency 40 for the left-hand frame member position. The cell with the highest slope to the right-hand frame member position 31 is the cell of tangency 41 to the right-hand frame member position.

The method proceeds by calculating the distance from each position of the frame member to the corresponding cell of tangency D5, D6. These distances may be calculated using the Pythagorean Theorem to calculate the square root of the sum of the square of the horizontal distance from the position of the frame member 30, 31 to the corresponding cell of tangency 40, 41, and the square of the vertical displacement of the cell of tangency 40, 41 relative to the corresponding position of the frame member 30, 31. The position of an unloaded (i.e., unoccupied) membrane installed on the frame member at 30, 31 can be approximated as a straight line 35 drawn between the positions of the frame member 30, 31, and can be used as an alternative reference for measuring displacements.

The method proceeds by determining the positions of a supporting membrane at the extreme ends of areas where it will bridge areas of concavity on the surface of the body along the spine and between the posterior and thighs 50, 51 for each transverse band.

These positions are approximated as the cells with the greatest displacement on the left side of the band 50, and the cell with the greatest displacement on the right side of the band 51. Then, the bridging distance D7 of a supporting band across areas of concavity is calculated. In a preferred embodiment of the invention, the bridging distance is approximated using the Pythagorean Theorem by calculating the square root of the sum of the square of the horizontal distance between the cells with the greatest displacement on the left side of the band 50 and right side of the band 51 and the square of the difference in displacement between the cells with the greatest displacement on the left side of the band 50 and right side of the band 51.

The lengths of the supporting bands in contact with the body L8, L9 are then calculated.

The lengths of the supporting bands on the left L8 and right L9 in contact with the body are approximated as the sum of the distances between the centers of each adjacent cell from and including the cell of tangency on the left side 40, to and including the cell of greatest displacement on the left side 50, and the distances between centers of each cell from and including the cell of tangency on the right side 41, to and including the cell of greatest displacement on the right side 51. The distances between centers of adjacent cells are calculated as the square root of the sum of the square of the horizontal distance between adjacent cells and the square of the difference in displacement between the adjacent cells.

The method proceeds by calculating the total length under load of each supporting band.

The total length under load of each supporting band is approximated as the sum of the distances (i.e., right and left) from the frame member locations to the cells of tangency (D5+D6 from step 5), the bridging distance (D7 from step 7) and the lengths of the supporting bands (right and left) in contact with the body (L8+L9 from step 8).

The method proceeds by calculating the average pressure multiplier for each band. The pressure multiplier is calculated as the sum of the distance from the position of the frame member on the left-hand side 30 to the left-hand cell of tangency 40 and the distance from the position of the frame member on the right-hand side 31 to the right-hand cell of tangency 41 divided by the sum of the displacement of the left-hand cell of tangency 40 from the left-hand location of the frame member 30 and the displacement of the right-hand cell of tangency 41 from the right-hand location of the frame member 31.

The method proceeds by calculating the desired total perpendicular-to-plane load for each supporting band. The perpendicular-to-plane load for each supporting band is calculated as the sum of the pressures measured by a conventional pressure measurement mat along the band when the pressure measurement mat and occupant are supported by a freely accommodating pad.

After calculating the desired total perpendicular-to-plane load for each supporting band, the relaxed length when not installed on a frame member of each band is calculated. The elasticity of the membrane material is define as:

$$LL=LR+f(T)$$

where LL is the length under load, LR is the relaxed length, and T is the tension applied to the material.

Tension applied to the supporting band is calculated as:

$$T=L \times MP$$

where L is the desired perpendicular-to-plane load, and MP is the average pressure multiplier, previously calculated as described above.

The relaxed length of the supporting band is calculated as:

$$LR=LL-f(L \times MP)$$

where LL is the length under load as calculated above.

The relaxed length of each band when not installed on a frame member can always be expected to be shorter than the distance between frame member locations 30, 31.

The method proceeds by calculating the optimum relaxed length when not installed on a frame member for each band in a given position for the described frame member position and membrane elasticity.

The relaxed length of the corresponding supporting bands, i.e., the length on the same plane at the same distance from the intersection from the back and bottom planes for all sampled individuals are weighted by the frequency of occurrence of the individual's stature in the general adult population. An arithmetic mean, as calculated and weighted as described immediately above, of the supporting band for each position is calculated as the optimum. The mode, median or other summary statistic may be determined and chosen as an alternative optimum.

The method proceeds by defining the relaxed shape of the supporting membrane when not installed on a frame member. The relaxed shape when not installed on a frame member of the optimal supporting membrane is defined by a transverse width at each centimeter (i.e., the width selected for the bands) from intersection of the back and bottom planes that corresponds to the optimum relaxed length of the corresponding band.

The method proceeds by then using the variation in the relaxed length when not installed on a frame member of corresponding bands calculated for multiple passengers to guide the optimization of the frame member shape. The standard deviation of the relaxed length when not installed on a frame member of the corresponding bands for all passengers is then calculated. Where an atypically high variation (i.e., standard deviation) is noted, the position of the frame member is moved outward and/or (on the back plane) forward or (on the bottom plane) upward and the relaxed membrane shape is re-optimized according to the previous method steps.

The variation in the relaxed length when not installed on a frame member of corresponding bands of multiple passengers is then used to guide the optimization of the membrane elasticity. The standard deviation of the relaxed length of the corresponding bands for all passengers is calculated as described above. Where atypically high variation (i.e., standard deviation) is noted, a membrane with greater localized elasticity is used in the region of that band and the relaxed membrane shape is re-optimized according to the previous method steps.

To optimize the seat for multiple postures, the above-described method steps may be repeated for additional postures.

Methods of optimizing the geometry of a two-dimensional seating element are described above. Various details of the invention may be changed without departing from the scope of the invention. Furthermore, the foregoing description of the embodiments of the invention and the best mode for practicing the invention are provided for the purpose of illustration only and not for the purpose of limitation, the invention being defined by the claims.

What is claimed is:

1. A method for optimizing the geometry of a seat membrane, comprising:
    (a) forming a three-dimensional map of a contact body portion of a subject seated in a predetermined posture on the seat membrane and dividing the three-dimensional map from front to back into a plurality of transverse bands oriented from the subject's left to right or right to left;
    (b) dividing each of the transverse bands into cells and calculating an average displacement of the cells from one or more reference planes corresponding to one of a transverse back plane and a transverse bottom plane of the seat membrane unloaded without the subject seated on the seat membrane;
    (c) defining positions of frame members supporting each end of the seat membrane relative to each of the transverse bands;
    (d) identifying cells of tangency from the positions of the frame members to the transverse bands and calculating a distance from each of the positions of the frame members to the cells of tangency;
    (e) determining positions of the seat membrane at ends of areas that bridge areas of concavity on the surface of the subject's body for each of the transverse bands and calculating a bridging distance of transverse bands across areas of concavity;
    (f) calculating lengths of the transverse bands in contact with the body;
    (g) calculating a total length under load of each transverse band;
    (h) calculating an average pressure multiplier for each transverse band;
    (i) calculating a desired total perpendicular-to-plane load for each transverse band calculated as a sum of pressures measured by a pressure measurement mat along each transverse band when the mat and subject are supported by a freely accommodating pad;
    (j) calculating a relaxed length of each transverse band when not installed on the frame members;
    (k) calculating an optimum relaxed length of each transverse band when not installed on the frame members based on the frame position and seat membrane elasticity to define a relaxed shape of the seat membrane when not installed on the frame members; and
    (l) utilizing variations in the relaxed length of each transverse band when not installed on the frame members to optimize seat membrane elasticity to accommodate multiple subjects.

2. The method according to claim 1, wherein the method is used to optimize frame member shape.

3. The method according to claim 1, further comprising the step of repeating steps (a)-(l) for additional seating postures and subjects.

4. The method according to claim 1, wherein the transverse bands are identified by whether the transverse bands are oriented to the transverse back plane or transverse bottom plane and by a distance from an intersection of the transverse back plane and transverse bottom plane.

5. The method according to claim 1, wherein the cells of tangency are identified by calculating a slope of a line connecting a location of an adjacent frame member and each cell such that the cell with the lowest slope to a left-hand frame member position is the cell of tangency for the left-hand frame member and the cell with the highest slope to the right-hand frame position is the cell of tangency for the right-hand frame member position.

6. The method according to claim 1, wherein the positions of the seat membrane at ends of areas that bridge the areas of concavity on the surface of the subject's body for each of the transverse bands are the cells with the greatest displacements on the left and right side of the transverse band.

7. The method according to claim 1, wherein the step of calculating a distance from each of the positions of the frame members to corresponding cells of tangency includes using the Pythagorean Theorem as the square root of the sum of the square of a horizontal distance from the position of a frame member to the frame member's corresponding cell of tangency and the square of a vertical displacement of the cell of tangency relative to the corresponding position of the frame member.

8. The method according to claim 1, wherein the lengths of the transverse bands in contact with the body are the sum of the distances between the centers of each adjacent cell from and including the cell of tangency on the left side, to and including a cell of greatest displacement on the left side, and the distances between centers of each cell from and including the cell of tangency on the right side, to and including the cell of greatest displacement on the right side, and wherein distances between centers of adjacent cells is calculated as the square root of the sum of the square of the horizontal distance between adjacent cells and the square of the difference in displacement between the adjacent cells.

9. The method according to claim 1, wherein the total length under load of each transverse band is the sum of the right and left distances from the frame member locations to the cells of tangency, the bridging distance and the lengths of the right and left transverse bands in contact with the body.

10. The method according to claim 1, wherein the average pressure multiplier for each transverse band is the sum of the distance from the position of the frame member on the left-hand side to the left-hand cell of tangency and the distance from the position of the frame member on the right-hand side to the right-hand cell of tangency divided by the sum of the displacement of the left-hand cell of tangency from the left-hand location of the frame member and the displacement of the right-hand cell of tangency from the right-hand location of the frame member.

11. The method according to claim 1, wherein the relaxed shape of each transverse band when not installed on the frame member is defined by a transverse width of the transverse band from the intersection of back and bottom planes that correspond to the optimum relaxed length of the corresponding transverse band.

\* \* \* \* \*